(12) United States Patent
Garcia (10) Patent No.: US 11,037,735 B2
(45) Date of Patent: Jun. 15, 2021

(54) VOLTAGE-CONTROLLABLE CAPACITIVE DEVICE, A METHOD FOR MANUFACTURING SUCH A DEVICE AND A METHOD FOR OPERATING SUCH A DEVICE, AND A DEVICE OF A SYSTEM FOR INDUCTIVE POWER TRANSFER

(71) Applicant: Bombardier Primove GmbH, Berlin (DE)

(72) Inventor: Federico Garcia, Rheinhausen (DE)

(73) Assignee: Bombardier Primove GmbH, Berlin (DE)

( * ) Notice: Subject to any disclaimer, the term of this patent is extended or adjusted under 35 U.S.C. 154(b) by 96 days.

(21) Appl. No.: 16/494,040

(22) PCT Filed: Mar. 27, 2018

(86) PCT No.: PCT/EP2018/057832
§ 371 (c)(1),
(2) Date: Sep. 13, 2019

(87) PCT Pub. No.: WO2018/178111
PCT Pub. Date: Oct. 4, 2018

(65) Prior Publication Data
US 2021/0118619 A1   Apr. 22, 2021

(30) Foreign Application Priority Data
Mar. 29, 2017 (GB) ..................................... 1704996

(51) Int. Cl.
*H01G 7/06*     (2006.01)
*B60L 53/12*    (2019.01)
*H02J 50/12*    (2016.01)

(52) U.S. Cl.
CPC ................ *H01G 7/06* (2013.01); *B60L 53/12* (2019.02); *H02J 50/12* (2016.02)

(58) Field of Classification Search
CPC ............. H01G 7/06; H02J 50/12; B60L 53/12
See application file for complete search history.

(56) References Cited

U.S. PATENT DOCUMENTS

| | | |
|---|---|---|
| 3,549,415 A | 12/1970 | Capek et al. |
| 5,207,304 A | 5/1993 | Lechner et al. |
| 6,727,535 B1 | 4/2004 | Sengupta et al. |
| 2012/0062338 A1 | 3/2012 | Kanno |
| 2013/0003253 A1 | 1/2013 | Testino |
| 2013/0328735 A1 | 12/2013 | Ishii et al. |
| 2017/0085131 A1 | 3/2017 | Liu et al. |

FOREIGN PATENT DOCUMENTS

| | | |
|---|---|---|
| JP | 2006093323 A | 4/2006 |
| WO | 2008050271 A3 | 5/2008 |
| WO | 2014067984 A2 | 5/2014 |

*Primary Examiner* — Robert L Deberadinis
(74) *Attorney, Agent, or Firm* — The Webb Law Firm (57) ABSTRACT

A voltage-controllable capacitive device includes a first dielectric material and at least one further dielectric material. At least the permittivity of the first dielectric material is DC voltage-dependent. A voltage dependence of the permittivity of the first dielectric material is different from a voltage dependence of the permittivity of the further dielectric material. The device further includes at least one voltage providing element for providing a DC voltage to the first dielectric material.

9 Claims, 6 Drawing Sheets

VOLTAGE-CONTROLLABLE CAPACITIVE DEVICE, A METHOD FOR MANUFACTURING SUCH A DEVICE AND A METHOD FOR OPERATING SUCH A DEVICE, AND A DEVICE OF A SYSTEM FOR INDUCTIVE POWER TRANSFER

CROSS-REFERENCE TO RELATED APPLICATIONS

This application is the United States national phase of International Application No. PCT/EP2018/057832 filed Mar. 27, 2018, and claims priority to United Kingdom Application No. 1704996.6 filed Mar. 29, 2017, the disclosures of which are hereby incorporated by reference in their entirety.

BACKGROUND OF THE INVENTION

Field of the Invention

The invention relates to a voltage-controllable capacitive device, a method for manufacturing such a device and a method for operating such a device and a device of a system for inductive power transfer.

Description of Related Art

Electric vehicles, in particular a track-bound vehicle and/or a road automobile, can be operated by electric energy which is transferred by means of an inductive power transfer. Such a vehicle may comprise a circuit arrangement which can be a traction system or a part of a traction system of the vehicle comprising a receiving device adapted to receive an alternating electromagnetic field and to produce an alternating electric current by electromagnetic induction. Furthermore, such a vehicle can comprise a rectifier adapted to convert an alternating current to a direct current. The direct current can be used to charge a traction battery or to operate an electric machine. In the latter case, the direct current can be converted into an alternating current by means of an inverter.

The inductive power transfer is performed using two sets of e.g. three-phase windings. A first set is installed on the ground (primary windings) and can be fed by a wayside power converter (WPC). The second set of windings (secondary windings) is installed on the vehicle. For example, the second set of windings can be attached underneath the vehicle, in the case of trams under some of its wagons. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

Due to presence of a large clearance between the primary windings and the secondary windings, the operational behaviour of this transformer is different than the behaviour of conventional transformers which have a closed magnetic core with negligible or small air gaps. The large air gap results in smaller mutual inductive coupling and larger leakage inductances.

The leakage inductance usually acts as a series inductance with each secondary winding. To be able to transfer high power levels, it is necessary to use an adequate capacitance in order to compensate the reactance of the inductors at an operating frequency of e.g. 20 kHz on the primary side as well as on the secondary side.

With respect to the secondary side of the high frequency transformer, the combination of the inductance(s), which can comprise the main or mutual inductance and/or the leakage inductance, and the capacitance(s), which can comprise the compensating capacitance, forms a resonant circuit. A perfect impedance cancellation happens if impedance values of the inductance(s) and the capacitance(s) are chosen such that the natural resonance frequency of the resonant circuit is equal to the operating frequency. Such a resonant circuit is said to be tuned. Such a tuning is also desired on the primary side.

Subject to temperature changes and/or aging, a tolerance of a capacitance can increase. In particular, configurations with magnetically permeable materials tend to drift in the relevant parameters. This may result in a detuning of the resonant circuit, wherein the changed resonant frequency does not correspond to the operating frequency any more. Such a detuning deviates the overall performance and power transfer capability of the inductive power transfer system. Also, an impedance of the secondary side reflected to the primary side of the transformer can become capacitive. This can result in a leading current with respect to the voltage in the WPC which is highly unwanted because a leading current eliminates soft switching conditions of semiconductor switches and increases their power losses considerably. Under such operation conditions, a WPC can overheat and turn off which, in turn, interrupts the needed power transfer.

In particular for inductive power transmission applications it is therefore desirable to have a correct tuning in the system.

U.S. Pat. No. 5,207,304 B2 discloses a power pickup system for an electrically powered vehicle. The system comprises a pickup inductor connected to first and second nodes, a power receiving circuit coupled to said first and second nodes, a multiplicity of tuning capacitors, a branch selection means for selecting ones of said multiplicity of tuning capacitors to be coupled to said first and second nodes and for generating a selected signal for each selected tuning capacitor, and a multiplicity of switching circuits, each switching circuit selectively coupling a corresponding tuning capacitor to said first and second nodes. Each switching circuit includes a solid state switch and a trigger circuit coupled to said branch selection means and said solid state switch. Said trigger circuit senses the voltage across said solid state switch and, after receiving one said selection signal from said branch selection means that corresponds to said switching circuit, triggers closure of said solid state switch when said sensed voltage across said solid state switch is approximately zero. Thus, an output current of an inductive coupling system can be controlled by switching a tuning capacitance into or out of the control circuit.

WO 2014/0467984 A3 discloses a circuit arrangement, in particular a circuit arrangement of an electric vehicle for inductive power transfer to the vehicle, wherein the circuit arrangement comprises a pick-up arrangement and at least one variable compensating arrangement, wherein the variable compensating arrangement comprises a capacitive element, wherein the variable compensating arrangement further comprises a first switching element and a second switching element, wherein the first switching element and the second switching element are connected in series, wherein the series connection of the first and the second switching element is connected in parallel to the capacitive element of the variable compensating arrangement.

In addition to the field of inductive power transfer, a variable capacitor technology is desirable for any electric circuit that uses resonance, filtering, harmonic reduction or amplification. In this context, a variable capacitor can denote a capacitor whose capacitance may be intentionally and repeatedly changed, e.g. mechanically or electronically. Variable capacitors are often used in oscillating circuits to set the resonant frequency, e.g. to tune a radio (therefore it is sometimes called a tuning capacitor or tuning condenser), or as a variable reactance, e.g. for impedance matching in antenna tuners.

SUMMARY OF THE INVENTION

The invention relates to a voltage-controllable capacitive device, a device of a system for inductive power transfer, in particular a primary or a secondary unit of such a system, and a method for manufacturing and a method for operating such a voltage-controllable capacitive device.

There is the technical problem of providing a capacitive device which allows to vary a capacitance in a precise, quick way and in a desired capacitance range, in particular for the usage in a system for inductive power transfer.

A voltage-controllable capacitive device, i.e. a voltage-controllable capacitor, is proposed. A capacitance of the voltage-controllable capacitive device can be controlled by adjusting a DC (direct current) voltage which is applied to the capacitive device, i.e. a control voltage. In particular, the capacitance, in particular the capacitance variation, can be adjusted as a function of the applied DC voltage. Preferably, the capacitance value decreases with an increasing level of the applied DC voltage which can also be referred to as control voltage in the following. Some commonly used dielectric material can have such a characteristic which can also be referred to as DC bias characteristic or as DC bias-based variation.

The capacitive device comprises a first dielectric material and at least one, preferably more than one, further dielectric material.

The first and/or the at least one further dielectric material can be each be provided by or in form of a material layer. The material layers can be material layers of a multi-layer composite. Alternatively, the material layer can each be provided by separate components.

A material layer can have a predetermined thickness. The material layers providing the first and the at least one further dielectric materials can e.g. be stacked one upon another. The first and the at least one further dielectric material can also provide a composite.

It is possible that the capacitive device further comprises two or more electrodes. An electrode can e.g. be a plate electrode.

The electrodes can be made of an electrically conductive material. It is further possible that each of the dielectric materials is arranged between two electrodes. Preferably, layers of the dielectric materials can be stacked one upon another, wherein electrodes are arranged in between the layers and on the top layer and under the bottom layer of the stack. In this case, the electrode arranged on the top layer and the electrode arranged under the bottom layer can each provide a terminal electrode. Each layer can be provided by the first or the further dielectric material.

Preferably, the layer or a set of multiple layers provided by the first dielectric material is enclosed by layers provided by the further dielectric material. Further, electrode plates can be arranged in between to layers. A first termination means can be provided by a first electrode plate or a first set of electrode plates which can be connected electrically. Further, a second termination means can be provided by a further electrode plate or a second set of further electrode plates which can be connected electrically. These termination means can provide terminals for the AC operating voltage. Further, these termination means can provide terminals for the DC control voltage.

It is e.g. possible that a first set of electrode plates protrude from a first side of the stack of layers, wherein a second set of electrode plates protrude from a second side of the stack. The protruding section can each be connected by a terminal element, e.g. a plate, which can provide a termination means for the AC operating voltage.

It is further possible that a subset of the first set of electrode plates additionally protrudes from a third side of the stack of layers, wherein a subset of the second set of electrode plates additionally protrudes from a fourth side of the stack. The subsets can each comprise electrode plates which are arranged adjacent to a layer provided by the first dielectric materials. These protruding sections can each be connected by a terminal element, e.g. a plate, which can provide a termination means for the DC control voltage.

It is also possible to use the first and the further dielectric material as ceramic layer materials during the standard design and manufacturing of a multilayer ceramic capacitor (MLCC). In this case, the aforementioned layers can be provided by ceramic material layers. In particular, at least one or multiple but not all ceramic layers of a MLCC can be provided by the first dielectric material. The remaining layers can be provided by the further dielectric material.

Alternatively, the composite of the dielectric materials can be arranged between two electrodes. In this case, each of these two electrodes can provide a terminal electrode.

A first terminal of the capacitive device can be connected to a first electrode, in particular to a first terminal electrode. A second terminal of the capacitive device can be connected to another electrode, in particular a second terminal electrode.

By means of the terminal electrodes, a dielectric material can electrically be connected to such a terminal.

Further, at least the permittivity of the first dielectric material is DC voltage-dependent. In other words, the permittivity of the first dielectric material can be changed by a varying DC voltage which is applied to the first dielectric material, e.g. to electrodes which border or enclose the first dielectric material. That a dielectric material is DC voltage-dependent can mean that the permittivity of the first dielectric material changes more than 5 percent by changing the applied DC voltage, in particular if the applied DC voltage with a predetermined level is changed more than 1 or more percent. Usually, however, the permittivity-DC voltage-relationship, i.e. the DC bias curve, is a nonlinear relationship. It is e.g. possible that the capacitance of the device is changed by more than 90 percent over a certain range of control voltage levels, wherein the certain range can be a subrange of all admissible voltage levels.

Further, a voltage dependence, i.e. a DC bias characteristic, of the permittivity of the first dielectric material is different from a voltage dependence of the permittivity of the further dielectric material. In other words, a change of the permittivity of the first dielectric material is different, e.g. smaller or higher, from the change of the permittivity of the further dielectric material if the applied DC voltage is changed by the same amount. In other words, the capacitive device comprises two dielectric materials with differing voltage dependencies. In further other words, the DC bias characteristic of the first dielectric material can be different from the DC bias characteristic of the further dielectric material. In particular, the first dielectric material can have a higher DC bias characteristic than the further dielectric material, i.e. the DC bias-based variation of the first dielectric material can be higher than the DC bias-based variation of the further dielectric material, in particular if the same control voltage change is applied to the respective material. In particular, the further dielectric material can have a low or no DC bias characteristic or bias-based variation.

For example, the permittivity of the first dielectric material can be changed by 10 percent if the control voltage is changed by 10 percent. In comparison, the permittivity of the at least one further dielectric material can be changed by 0.5 percent if the control voltage is changed by said 10 percent.

Further, the device comprises at least one voltage providing means, e.g. a voltage generating means, in particular a voltage source or any other kind of voltage providing means, for providing a DC voltage, i.e. a control voltage, to the first dielectric material. It is further possible that a control voltage is only provided to the first dielectric material, i.e. to the material with the higher DC bias characteristic or bias-based variation, or to selected or all layers of the first dielectric material but not to any other layer of dielectric material. In particular, the control voltage can be applied to electrodes bordering or enclosing the first dielectric material.

As a result, a voltage-controllable capacitive device is provided which is allows to adjust a capacitance of the capacitive device by adjusting the control voltage level. As a result of adjusting the control voltage level, the permittivity of the first dielectric material and, if applicable, a permittivity of the at least one further dielectric material, is changed. As the permittivity change as a function of the applied control voltage is a deterministic change, the capacitance value can be adjusted to a desired value. This advantageously allows to provide a quick, precise and easy-to-control adjustment of the capacitance of the capacitive device. Such an adjustment can e.g. be desired for different operation scenarios, e.g. to adjust a resonant frequency of an oscillating circuit comprising the proposed capacitive device to a desired value. In this case, the oscillating circuit can e.g. comprise a winding structure, e.g. a primary or a secondary winding structure, of a system for inductive power transfer.

The application of the proposed device is not limited to the field of inductive power transfer. In particular, the device can provide an electrically controlled variable capacitance for low and high power applications.

Also, adjusting the capacitance can be used to adjust the bandwidth and/or the cutting frequencies of filter elements.

Further, the first dielectric material and/or the at least one further dielectric material is/are provided by a ceramic material. This means that the ceramic material acts as the dielectric material. A composition of the ceramic material can define the electrical behavior of the dielectric material. Ceramic materials for capacitors are known from so called class 1 ceramic capacitors, class 2 ceramic capacitors and class 3 ceramic capacitors. It is in particular possible that one of the ceramic materials which are used for a ceramic capacitor of one of such classes is used as the first dielectric material, wherein a ceramic material different from the first dielectric material is used as the further dielectric material. The further dielectric material can also be a ceramic material used for one of these capacitors. Preferably, the further dielectric material is selected as the ceramic material of a ceramic capacitor from another class than the ceramic capacitor which comprises the first dielectric material. Using ceramic materials as dielectric material advantageously allows to provide components which generate only low losses during operation, with a high admissible operating temperature, with a high thermal stability, e.g. very small capacitance changes with temperature and very small thermal expansion, with a low volume to capacitance ratio. Further the resulting device can be used for high power class applications.

According to the invention, the first dielectric material is provided by a class 2 ceramic capacitor material. A class 2 ceramic capacitor is e.g. defined in the document EIA-198-2, revision E, Jan. 1, 1998 published by Electronic Components Industry Association (ECIA), published on Apr. 4, 2014. Class 2 ceramic capacitors offer high volumetric efficiency with change of capacitance lower than −15% to +15% and a temperature range greater than −55° C. to +125° C. Using the ceramic material from a class 2 ceramic capacitor as the first dielectric material advantageously allows a usage in medium power applications. Class 2 ceramic capacitors have a comparatively high DC bias-based variation and small volume and a desired temperature behaviour. A power rating of class 2 ceramic capacitors is higher than the power rating of class 1 ceramic capacitors and lower than the power rating of class 3 capacitors. In general, high power ratings can be achieved by using several capacitors, each one with a relative small power rating, wherein the resulting power rating can be sum of the small power ratings.

Alternatively, the first dielectric material is provided by a class 3 ceramic capacitor material. Such a class 3 ceramic capacitor is also defined in the above mentioned document. A class 3 ceramic capacitor offers a higher volumetric efficiency than a class 2 ceramic capacitor and a typical change of capacitance by −22% to +56% over a lower temperature range of +10° C. to +55° C. Using a class 3 ceramic capacitor material as the first dielectric material advantageously allows a usage in high power applications. Class 3 ceramic capacitors have a comparatively high DC bias-based variation and small volume.

Further, the at least one further dielectric material is provided by a class 1 ceramic capacitor material. A class 1 capacitor is also defined in the above mentioned document.

Class 1 ceramic capacitors offer a high stability and low losses for resonant circuit applications.

Using a class 1 ceramic capacitor material as the at least one further dielectric material advantageously allows to a usage in medium power applications. Class 1 ceramic capacitors have no DC bias-based variation and a desired temperature behavior.

Class 1 ceramic capacitor materials have no DC bias-based variation, in particular due to non polarizable crystals. Class 2 and Class 3 ceramic capacitor materials have a comparatively high DC bias-based variation, in particular due to electrically polarized crystals.

In another embodiment, the permittivity of the at least one further dielectric material is not DC voltage-dependent. In other words, a change of a DC voltage level applied to the at least one further dielectric material does not change the permittivity of said further dielectric material, e.g. not more than a predetermined amount or percentage, e.g. more than 5%.

In this case, the first dielectric material or different portions of the capacitive device comprising the first dielectric material can be the only components of the capacitive device which allow to change the permittivity and, consequently, the resulting capacitance. This advantageously allows a simple control of the capacitance.

In another embodiment, the first dielectric material is arranged in between two other dielectric materials, wherein a voltage dependence of the permittivity of the first dielectric material is different from a voltage dependence of the permittivity of each of the further dielectric materials. It is possible that electrodes are arranged in between two dielectric materials. In particular, the two further dielectric materials can be similar materials. For example, a class 2 ceramic capacitor material or a class 3 ceramic capacitor material can be arranged between two class 1 ceramic capacitor materials. Preferably, the two further dielectric materials are not DC voltage-dependent.

As a result, the first dielectric material is decoupled from DC signals which are not provided by the aforementioned voltage providing means. In particular, the further dielectric materials, in particular the capacitors provided by the further dielectric materials, will block DC signals, in particular when charged up to the applied DC voltage. By embedding the first dielectric material in between the two further dielectric materials, AC and DC components of a signal applied to the proposed capacitive device can be separated. This advantageously allows an easy control of the resulting capacitance of the proposed capacitive device since no further control voltage portions have to be considered.

In another embodiment, the device comprises a first capacitor with a first dielectric material and at least one further capacitor with the at least one further dielectric material, wherein the first and the further capacitor are provided by separate components. Each capacitor can e.g. comprise one or more electrodes. In particular, the device can comprise more than the first and the at least one further capacitor, e.g. three or more capacitors.

The capacitors of the device can be connected electrically in parallel and/or electrically in series. It is, for instance, possible that the device comprises two, three or even more capacitor sub banks, wherein one sub bank comprises at least two capacitors which are connected in parallel. One, multiple but not all, or all capacitor(s) of a sub bank can be (a) capacitor(s) with the first dielectric material. Remaining capacitor(s) of said sub bank can be capacitor(s) with a dielectric material different from the first dielectric material, e.g. the further dielectric material. It is, however, also possible that all capacitor of the sub bank are capacitors with a dielectric material different from the first dielectric material, e.g. the further dielectric material.

The sub banks can be connected electrically in series. In this case, one, multiple but not all, or all capacitor(s) of one of the sub banks, in particular of an intermediate sub bank, can be (a) capacitor(s) with the first dielectric material. An intermediate sub bank can denote a sub bank of capacitors which is electrically arranged in between two other sub banks, preferably between sub banks with capacitors with the further dielectric material. This means that the two sub banks are electrically connected by the intermediate sub banks. Providing the device by capacitors as separate components advantageously allows to use off the shelf products to manufacture a desired voltage-controllable capacitive device.

In an alternative embodiment, the device is provided by a monolithic compound. The compound can comprise the dielectric materials. Further, the compound can comprise electrodes and/or electrical connections of the dielectric materials. In particular, it is possible to integrate the different materials into the standard manufacturing process of a ceramic capacitor. This has been explained before. It is e.g. possible to provide a ceramic capacitor with multiple layers, wherein different materials can be used for the layers. In this case, it is e.g. possible to provide one or multiple layers of class 1 ceramic capacitor material, provide an electrode plate and arrange it on the layer(s) of class 1 ceramic capacitor material, provide one or multiple layers of class 2 ceramic capacitor material and arrange it on the electrode plate, provide one or multiple layers of class 1 ceramic capacitor material and arrange it on the last-mentioned electrode plate.

Preferably, the electrode plates which are in contact with a class 2 ceramic capacitor material can have a L-shaped cross section, wherein one leg of the electrode plate provides a connecting terminal for the control voltage. It is also possible that two separate electrode plates are in contact with a class 2 ceramic capacitor, wherein one of the electrode plates provides a connecting terminal for the control voltage.

This advantageously allows to provide a capacitive device with small dimensions which, in turn, reduces building space requirements and further results in a simple manufacturing of the device, in particular the standard manufacturing process of MLCC can be used to provide the proposed variable capacitive device.

In another embodiment, a maximum admissible output voltage of the voltage providing means is chosen as a function of a desired capacitance change. In particular, the maximum admissible output voltage of the voltage providing means can be chosen such that a desired minimal capacitance or a desired maximal capacitance of the proposed device is provided if the maximum admissible output voltage is applied to the first dielectric material.

Further, the capacitive device can be designed such that a maximum value of the sum of the maximum admissible output voltage of the voltage providing and a maximum value of the voltage portion of the operating voltage which falls across the first dielectric material is smaller than a maximum peak voltage or a maximum peak-to-peak voltage of the first dielectric material. In other words, the capacitive device, in particular the arrangement of dielectric materials and/or their electrical connections, is designed such that a maximum peak voltage or a maximum peak-to-peak voltage is not exceeded during the operation.

Further, the capacitive device can be designed such that the absolute amount or percentage of capacitance variation for a predetermined control voltage level change from a predetermined control voltage level is provided.

Further, the capacitive device can be designed such that the capacitive device can be used in high power or low power class application.

Further proposed is a method for manufacturing a voltage-controllable capacitive device. The method advantageously allows to manufacture the voltage-controllable capacitive device according to one of the embodiments described in this disclosure.

In a first step, a first dielectric material and at least one further dielectric material are provided, wherein at least the permittivity of the first dielectric material is DC voltage-dependent. Further, a voltage dependence of the permittivity of the first dielectric material is different from a voltage dependence of the permittivity of the further dielectric material. Further, the first dielectric material and the at least one further dielectric material is provided by a ceramic material, wherein the first dielectric material is provided by a class 2 ceramic capacitor material or by a class 3 ceramic capacitor material, wherein the at least one further dielectric material is provided by a class 1 ceramic capacitor material In a further step, at least one voltage providing means for providing a DC voltage to the first dielectric material is provided. The at least one voltage providing means is electrically connected to the first dielectric material. In particular, the electrical connection is provided such that a variable and controlled DC voltage can be applied to the first dielectric material and thus falls across the first dielectric material. Further, the first and the at least one further dielectric material are arranged such that a desired capacitance of the proposed capacitive device is provided, e.g. if no control voltage or if a maximum admissible control voltage is applied.

Further proposed is a method for operating a voltage-controllable capacitive device according to one of the embodiments described in this disclosure. For controlling the capacitance, at least one voltage providing means is controlled such that a desired output voltage of said voltage providing means, i.e. control voltage, is provided to the first dielectric material. Further, the desired output voltage is determined as a function of a desired capacitance of the capacitive device.

In other words, a desired capacitance of the capacitive device can be adjusted by adjusting the control voltage provided by the at least one voltage providing means.

It is further possible that a maximum output voltage of the at least one voltage providing means is limited to a preset value, wherein the preset value is chosen as a function of a desired capacitance change or a desired capacitance. The desired capacitance change can e.g. be a percentage change of a nominal value of the capacitance of a capacitor comprising the first dielectric material if no DC control voltage, i.e. a zero volt control voltage, is applied to the first dielectric material. This advantageously allows a precise, quick and easy-to-implement adjustment of a capacitance. Further allowed is an adjustment of the capacitance under life operation, i.e. when electrical flow is present. Adjusting the capacitance is of advantage for numerus applications as will be outlined in the following.

Further proposed is a device of a system for inductive power transfer. The device can e.g. be a primary-sided device or a secondary-sided device of the system for inductive power transfer.

The device comprises at least one winding structure for generating an electromagnetic field, i.e. a primary winding structure, or for receiving an alternating electromagnetic field, i.e. a secondary winding structure. In the case of a primary-sided device, the at least one winding structure is a winding structure for generating an alternating electromagnetic field for inductive power transfer which is then received by a receiving winding structure of a secondary-sided device of said system for inductive power transfer. A secondary-sided device comprises, as explained before, a winding structure for receiving the alternating electromagnetic field.

Further, the device comprises a voltage-controllable capacitive device according to one of the embodiments described in this disclosure. The voltage-controllable capacitive device can electrically be connected to the at least one winding structure. It is e.g. possible that a terminal of the winding structure is electrically connected to a terminal of the voltage-controllable capacitive device.

It is, of course, possible that the device comprises further electric or electronic elements.

As a result, the device comprises a LC oscillating circuit arrangement which comprises at least the winding structure and the voltage-controllable capacitive device. By changing the capacitance of the voltage-controllable capacitive device, a resonant frequency of the LC oscillating circuit arrangement can be adjusted, e.g. to a desired value. As mentioned before, the capacitance can be adjusted to the desired value by applying a control voltage to the first dielectric material. In particular, it is possible to adjust the resonant frequency of the LC oscillating circuit arrangement to the value of a desired operating frequency, e.g. to 20 kHz. Further, the capacitance of the voltage-controllable capacitive device can be changed as a function of a detuning of the LC oscillating circuit arrangement, e.g. as a function of an inductance change of the winding structure.

In other words, the use of at least one voltage-controllable capacitive device according to one of the embodiments described in this disclosure as a capacitive element in a device of a system for inductive power transfer, in particular in a primary-sided device or a secondary-sided device, is proposed.

BRIEF DESCRIPTION OF THE DRAWINGS

The invention will be described with reference to the attached figures. The figures show.

In the following, the same reference numerals denote the same or similar technical elements.

DESCRIPTION OF THE INVENTION

Figure 1:
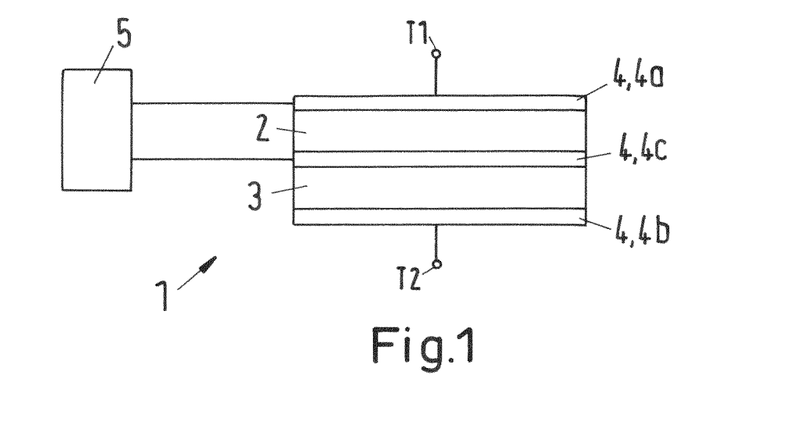
FIG. 1 a schematic circuit diagram of a voltage-controllable capacitive device according to the invention, FIG. 2 a schematic circuit diagram of a voltage-controllable capacitive device according to another embodiment of the invention, FIG. 3 a schematic circuit diagram of a voltage-controllable capacitive device according to another embodiment of the invention, FIG. 4 a schematic circuit diagram of a voltage-controllable capacitive device according to another embodiment of the invention, FIG. 5 a schematic circuit diagram of a primary-sided device of a system for inductive power transfer, FIG. 6 a schematic circuit diagram of a secondary-sided device of a system for inductive power transfer, FIG. 7 a schematic circuit diagram of a voltage-controllable capacitive device according to another embodiment of the invention, FIG. 8 a schematic circuit diagram of a voltage-controllable capacitive device according to another embodiment of the invention, FIG. 9 a schematic circuit diagram of a voltage-controllable capacitive device according to another embodiment of the invention, FIG. 10 a schematic circuit diagram of a primary-sided device of a system for inductive power transfer, FIG. 11 a schematic circuit diagram of a secondary-sided device of a system for inductive power transfer and FIG. 12 a schematic perspective view of a voltage-controllable capacitive device according to another embodiment of the invention.

FIG. 1 shows a schematic circuit diagram of a voltage-controllable capacitive device 1 according to a first embodiment of the invention. The device 1 comprises a first dielectric material 2 and a further dielectric material 3. The first dielectric material 2 is provided by a material layer with a predetermined thickness, wherein the thickness can be a design parameter. The further dielectric material 3 is provided also by a material layer, e.g. with a predetermined thickness.

Further, device 1 comprises electrodes 4, in particular plate-electrodes 4. Further shown is a first terminal T1 and a second terminal T2 of the capacitive device 1. The first terminal T1 is electrically connected to a first outer electrode 4a, the second terminal T2 is electrically connected to a second outer electrode 4b. The terminals T1, T2 are terminals for an AC signal connection. In the shown embodiment, the first outer electrode 4a is arranged on a first outer surface of the stack of the first and the further dielectric material 2, 3. The second outer electrode 4b is arranged on a second outer surface of the stack of the first and the further dielectric material 2, 3. An intermediate electrode 4c is arranged in between the first and the further dielectric material 2, 3. Via the terminals T1, T2 the device 1 can be electrically connected to other electric or electronic elements.

Further, the device 1 comprises a voltage providing means 5, e.g. a voltage source for providing a DC voltage which can also be referred to as control voltage, to the first dielectric material 2. Output terminals of the voltage providing means 5 are electrically connected to the electrodes 4, 4a, 4c which enclose the first dielectric material 2, respectively. A maximum admissible output voltage of the voltage providing means can e.g. be limited to a preset value which can e.g. be a design parameter. In particular, the maximum admissible output voltage should be chosen such that a desired capacitance variation of the device 1 can be provided and such that admissible operating voltages of the first dielectric material 2 are not exceeded.

A voltage dependence of the permittivity of the first dielectric material 2 is different from a voltage dependence of the permittivity of the further dielectric material 3. In particular, the permittivity of the further dielectric material 3 is not DC voltage-dependent.

It is possible that the first dielectric material 2 is provided by a class 2 ceramic capacitor material, e.g. by X5R. Alternatively, the first dielectric material 2 can be provided by a class 2 ceramic capacitor material. Further, the further dielectric material 3 can be provided by a class 1 ceramic capacitor material. The device 1, in particular the first and the further dielectric material 2, 3 as shown in FIG. 1 can be provided as a monolithic compound.

Figure 2:
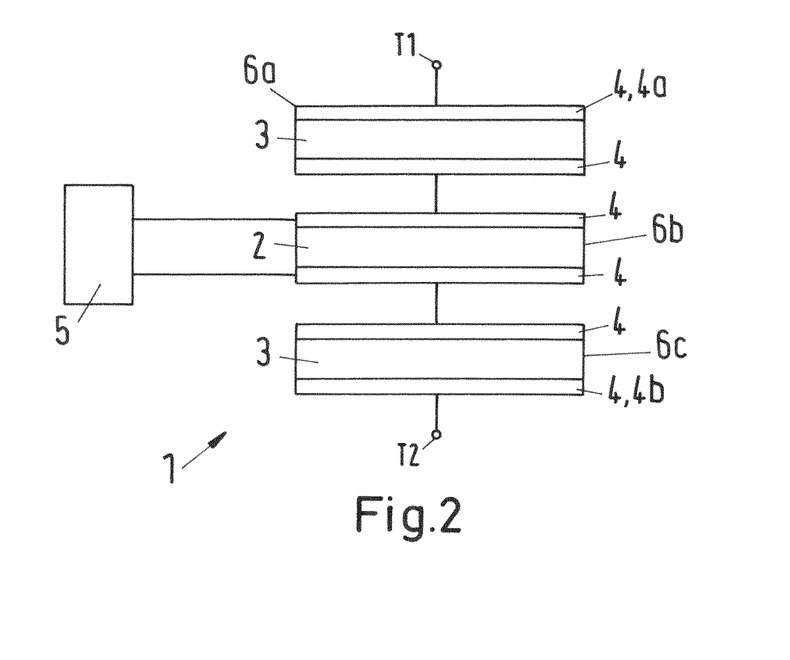

FIG. 2 shows a schematic circuit diagram of a voltage-controllable capacitive device 1 according to another embodiment of the invention.

The voltage-controllable capacitive device 1 comprises a first capacitor 6a, a second capacitor 6b and third capacitor 6c. The first capacitor 6a comprises two electrodes 4 and further dielectric material 3 which is arranged between the two electrodes 4. The second capacitor 6b comprises also two electrodes 4 and the first dielectric material 2 which is arranged between said two electrodes 4. The third capacitor 6c comprises two electrodes and the further dielectric material 3 which is arranged between the two said electrodes. The first capacitor 6a is electrically connected in series to the second capacitor 6b which is connected in series to the third capacitor 6c. Further, the capacitive device 1 comprises a voltage providing means 5 which is electrically connected to the second capacitor 6b, in particular to the electrodes 4 of the second capacitor 6b. The capacitive device 1 shown in FIG. 2 can be made of separate capacitors 6a, 6b, 6c which can be off the shelf products or by capacitors which are provided by separate layers in a monolithic ceramic capacitor.

FIG. 2 shows that the capacitor 6b which comprises the first dielectric material 2 is an intermediate capacitor which is electrically arranged between the first and the third capacitor 6a, 6c. The terminals T1, T2 of the capacitive device 1 are electrically connected to an outer electrode 4a of the first capacitor 6a and an outer electrode 4b of the third capacitor 6c. In this case, the first and the third capacitor 6a, 6c will block out DC signal components of an operating voltage signal which falls across the capacitive device 1, e.g. a voltage drop between the first and the second terminal T1, T2.

Figure 3:
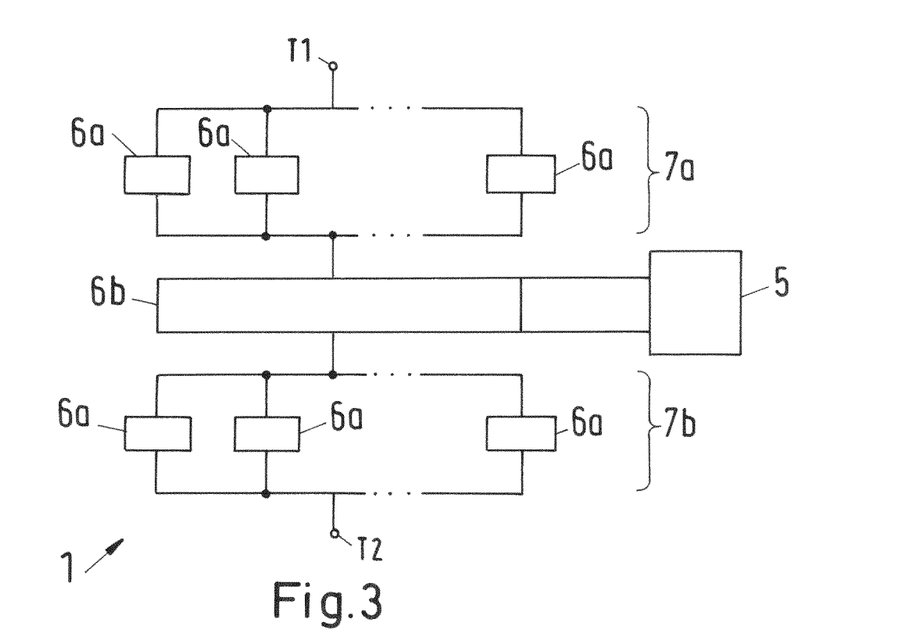

FIG. 3 shows a schematic circuit diagram of a voltage-controllable capacitive device according to another embodiment of the invention. The voltage-controllable device comprises a first sub bank 7a which comprises plurality of capacitors 6a with further dielectric material 3 connected in parallel. It is shown that the first sub bank 7a is electrically connected in series to a second capacitor 6b which comprises the first dielectric material 2 (see e.g. FIG. 2). The second capacitor 6b is electrically connected to the second sub bank 7b. A first terminal T1 of the capacitive device 1 is electrically connected to the first sub bank 7a, in particular to the terminal which is not connected to the second capacitor 6b. A second terminal of the capacitive device is electrically connected to a terminal of the second sub bank 7b, in particular to the terminal which is not connected to the second capacitor 6b.

Figure 4:
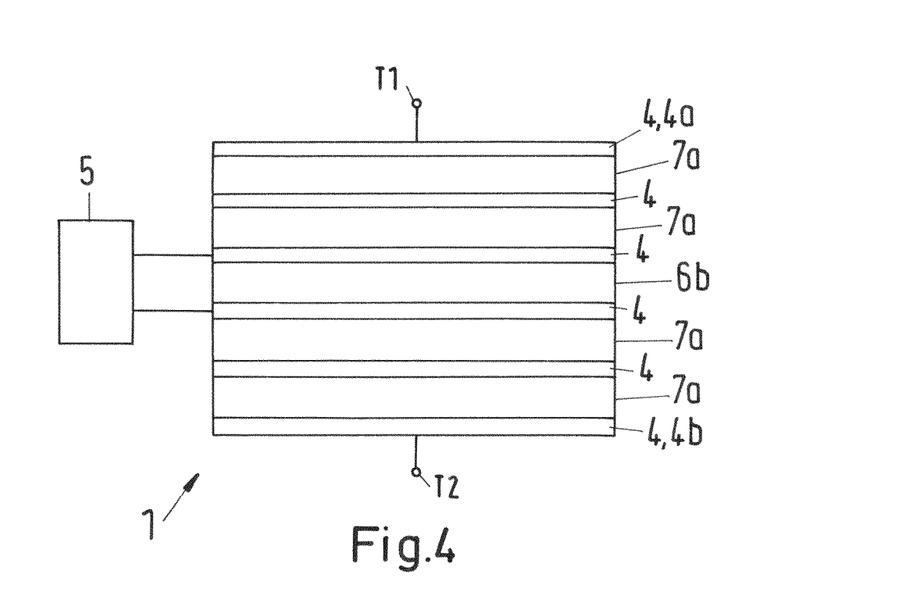

FIG. 4 shows a schematic circuit diagram of a voltage-controllable capacitive device according to another embodiment of the invention. It is shown that the device 1 comprises multiple sub banks 7a, 7b which each comprise a plurality of capacitors with the further dielectric material electrically connected in parallel. Further, the device 1 comprises at least one second capacitor 6b which comprises the first dielectric material. A voltage providing means 5 is electrically connected to the two electrodes 4 of the second capacitor 6b. It is shown that the second capacitor 6b is an intermediate capacitor within the series connection of the sub banks 7a, 7b and the second capacitor 6b.

It is e.g. possible that a sub bank 7a, 7b comprises a plurality, e.g. 106, MLCC (multilayer ceramic capacitor) with class 1 ceramic material as a dielectric material with a nominal capacitance of 100 nF and a nominal specified voltage limit of 630 V.

The second capacitor 6b can be provided by a MLCC class 2 ceramic capacitor material as a dielectric material with a capacitor's specified voltage limit of 1.260 V.

The number of capacitors and/or the electrical interconnection between the capacitors and/or electrical characteristics of the capacitors (e.g. the numeral capacitance, the maximum reactive voltage, the maximum phase current, the nominal phase current, the specified voltage limit and further electric characteristics) of the capacitive device 1 can be chosen such that a desired electrical behavior of the resulting voltage-controllable capacitive device 1 and a desired operational behavior, in particular an operational safety is provided.

In particular, the characteristics can be chosen such that the maximum voltage falling across each of the capacitors used in the capacitive device 1 during operation does not exceed a capacitor-specific maximum admissible voltage, e.g. a maximum peak voltage or a maximum peak-to-peak voltage, or a predetermined percentage thereof. This means that the control voltage level which is generated by the voltage providing means 5 has to be considered in the design of the voltage-controllable device 1.

Figure 5:
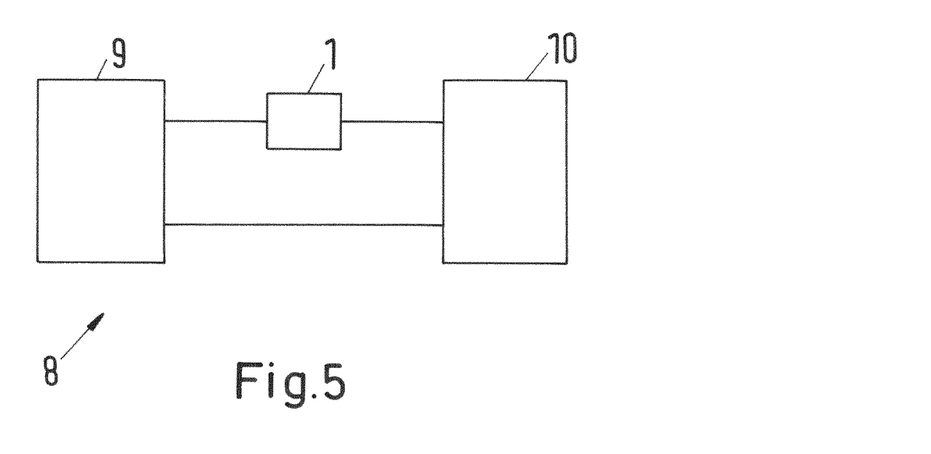

FIG. 5 shows a schematic circuit diagram of a primary-sided device 8 of a system for inductive power transfer, e.g. to a vehicle. The primary-sided device 8 comprises an operating voltage providing means 9, e.g. a voltage converter 9. The voltage converter 9 is electrically connected to a primary winding structure 10 via a voltage-controllable capacitive device 1, wherein the voltage-controllable device 1 is connected in series to the primary winding structure 10.

A control unit (not shown) can control the level of the control voltage provided by the voltage generating means 5 (see e.g. FIG. 2) such that the LC oscillating circuit arrangement comprising the primary winding structure 10 and the capacitive device 1 has a desired resonant frequency, e.g. resonant frequency which is equal to an operating frequency of the system for inductive power transfer, e.g. a frequency of 20 kHz.

Figure 6:
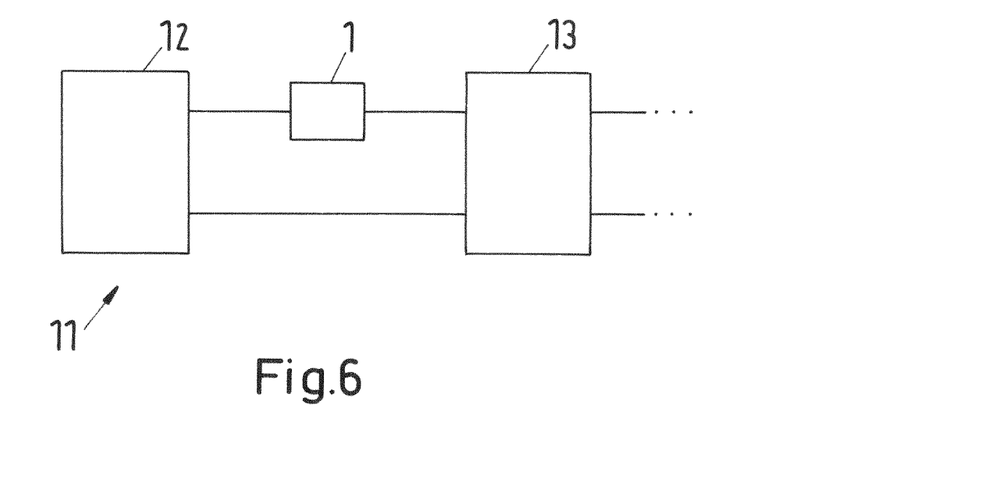

FIG. 6 shows a schematic circuit diagram of a secondary-sided device 11 of a system for inductive power transfer. The secondary-sided device 11 comprises a secondary winding structure 12 for receiving an alternating electromagnetic field which is e.g. generated by the primary-sided device (see FIG. 5). Further, the secondary-sided device 11 comprises a voltage-controllable capacitive device 1 (see e.g. FIG. 2) and a rectifier 13. The secondary winding structure 12 is electrically connected to the rectifier 13 via the capacitive device 1, wherein the voltage-controllable device 1 is connected in series to the secondary winding structure 12. A control unit (not shown) can e.g. control a control voltage level provided by the voltage providing means 5 such that the LC oscillating circuit arrangement comprising the secondary winding structure 12 and the capacitive device 1 has a predetermined or desired resonant frequency, e.g. a resonant frequency which is equal to the operating frequency.

Figure 7:
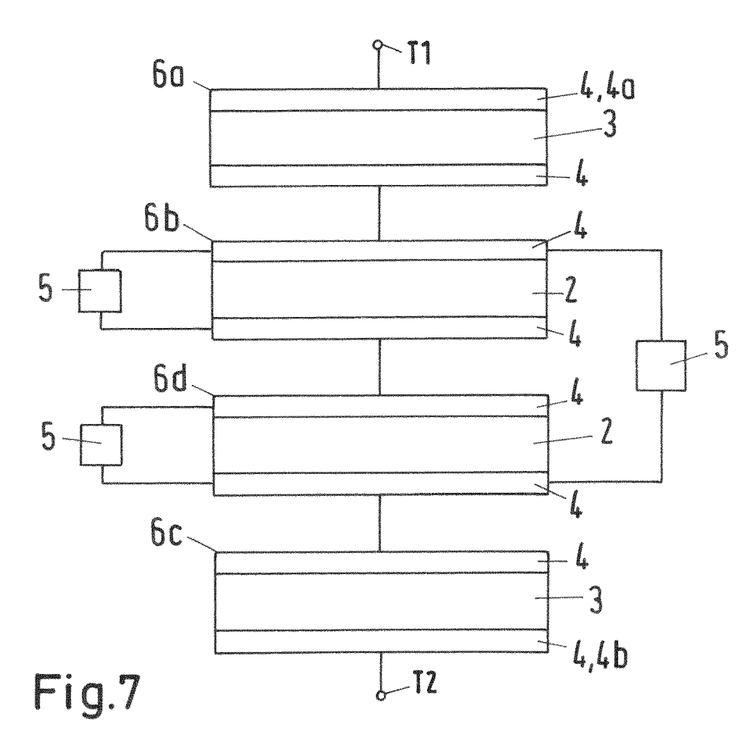

FIG. 7 shows a schematic circuit diagram of a voltage-controllable capacitive device 1 according to another embodiment of the invention. The capacitive device 1 shown in FIG. 7 is essentially designed as the capacitive device 1 shown in FIG. 2. It is thus referred to the corresponding description of the capacitive device 1. In contrast to the capacitive device 1 shown in FIG. 2, the capacitive device 1 shown in FIG. 7 comprises a fourth capacitor 6d. The fourth capacitor 6d comprises also two electrodes 4 and the first dielectric material 2 which is arranged between said two electrodes 4. The first capacitor 6a is electrically connected in series to the second capacitor 6b, wherein the second capacitor 6b is connected in series to the fourth capacitor 6c, wherein the fourth capacitor 6d is connected in series to the third capacitor.

Further, the capacitive device 1 comprises multiple voltage providing means 5. A first voltage providing means is electrically connected to the second capacitor 6b, in particular to the electrodes 4 of the second capacitor 6b. A second voltage providing means 5 is electrically connected to the fourth capacitor 6d, in particular to the electrodes 4 of the fourth capacitor 6d. A third voltage providing means 5 is electrically connected to the series connection of the second and the fourth capacitor 6b, 6d, e.g. to an electrode 4 of the second capacitor 6b, in particular the electrode 4 which is electrically connected to the first capacitor 6a, and to an electrode 4 of the fourth capacitor 6d, in particular the electrode 4 which is electrically connected to the third electrode 6c.

The capacitive device 1 shown in FIG. 2 can be made of separate capacitors 6a, 6b, 6c which can be off the shelf products or by capacitors which are provided by separate layers in a monolithic ceramic capacitor.

Figure 8:
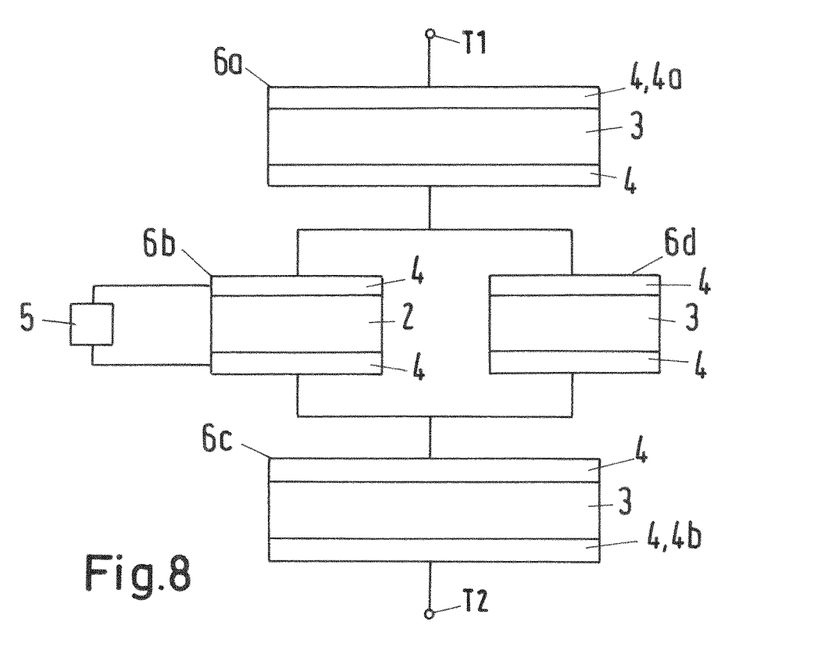

FIG. 8 shows a schematic circuit diagram of a voltage-controllable capacitive device 1 according to another embodiment of the invention. The capacitive device 1 shown in FIG. 8 is essentially designed as the capacitive device 1 shown in FIG. 2. It is thus referred to the corresponding description of the capacitive device 1. In contrast to the capacitive device 1 shown in FIG. 2, the capacitive device 1 shown in FIG. 8 comprises a fourth capacitor 6d. The fourth capacitor 6d comprises also two electrodes 4 and the further dielectric material 3 which is arranged between said two electrodes 4. The fourth capacitor 6d is connected in parallel to the second capacitor 6b. Thus, the first capacitor 6a is electrically connected in series to a parallel connection of the second capacitor 6b and the fourth capacitor 6d, wherein said parallel connection is connected in series to the third capacitor 6c.

It is shown that no DC voltage providing means 5 is electrically connected to the fourth capacitor 6d, in particular to its electrodes 4. It is, however, possible to connect a DC voltage providing means to the fourth capacitor 6d, in particular to its electrodes. The voltage providing means 5 can the voltage providing means 5 which is connected to the second capacitor 6b or a separate DC voltage providing means.

Figure 9:
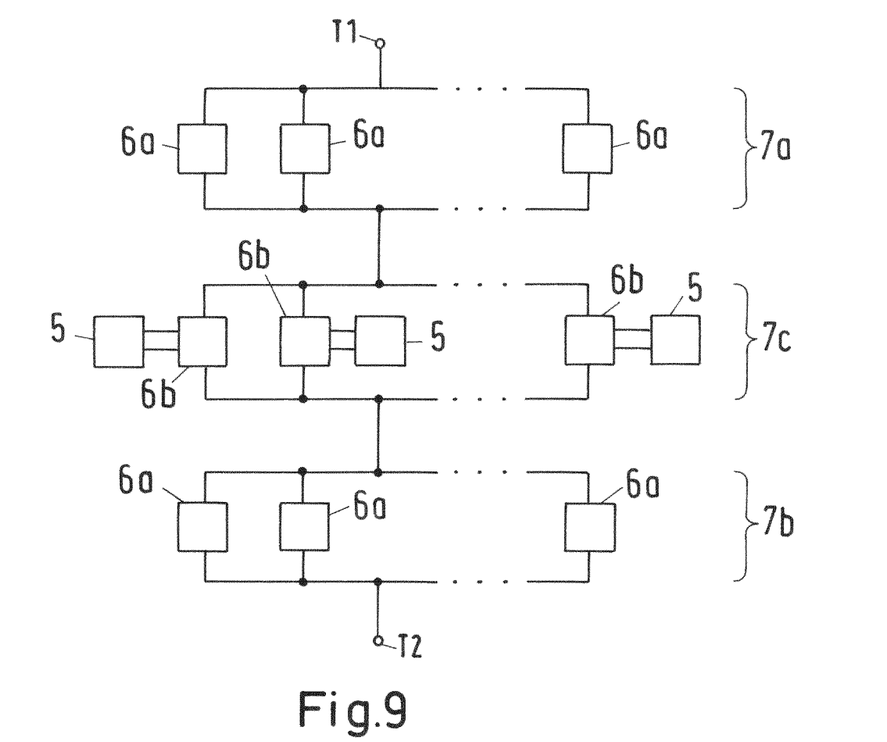

FIG. 9 shows a schematic circuit diagram of a voltage-controllable capacitive device 1 according to another embodiment of the invention. The capacitive device 1 shown in FIG. 9 is essentially designed as the capacitive device 1 shown in FIG. 3. It is thus referred to the corresponding description of the capacitive device 1. In contrast to the capacitive device 1 shown in FIG. 3, the capacitive device 1 shown in FIG. 9 comprises a third sub bank 7c which comprises a plurality of capacitors. It is shown that each capacitor 6b of the plurality of capacitors of the third sub bank 7c is a capacitor 6b with the first dielectric material 2. It is, however, also possible that the plurality of capacitors of the third sub bank 7c comprises only one capacitor 6b with the first dielectric material 2 or that multiple but not all capacitors of the third sub bank 7c are provided by a capacitor 6b with the first dielectric material 2.

It is shown that the first sub bank 7a is electrically connected in series to the third sub bank 7c. The third sub bank 7c is electrically connected to the second sub bank 7b.

Figure 10:
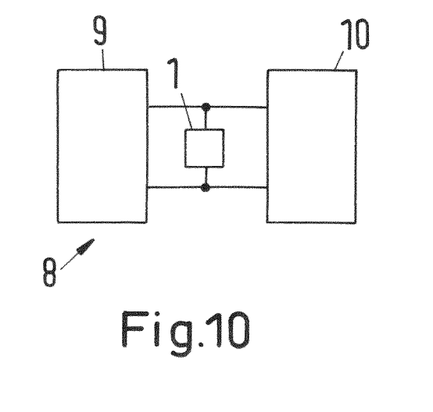

FIG. 10 shows a schematic circuit diagram of a primary-sided device 8 of a system for inductive power transfer, e.g. to a vehicle. The primary-sided device 8 shown in FIG. 10 is essentially designed as the primary-sided device 8 shown in FIG. 5. It is thus referred to the corresponding description of the primary-sided device 8. In contrast to the primary-sided device 8 shown in FIG. 5, the voltage-controllable device 1 is connected in parallel to the primary winding structure 10.

Figure 11:
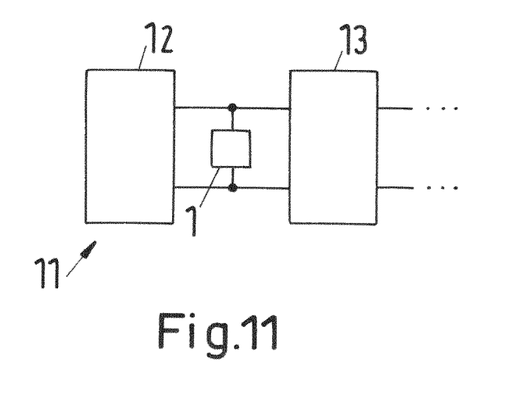

FIG. 11 shows a schematic circuit diagram of a secondary-sided device 11 of a system for inductive power transfer. The secondary-sided device 11 shown in FIG. 11 is essentially designed as the secondary-sided device 11 shown in FIG. 6. It is thus referred to the corresponding description of the secondary-sided device 11. In contrast to the secondary-sided device 11 shown in FIG. 6, the voltage-controllable device 1 is connected in parallel to the secondary winding structure 12.

Figure 12:
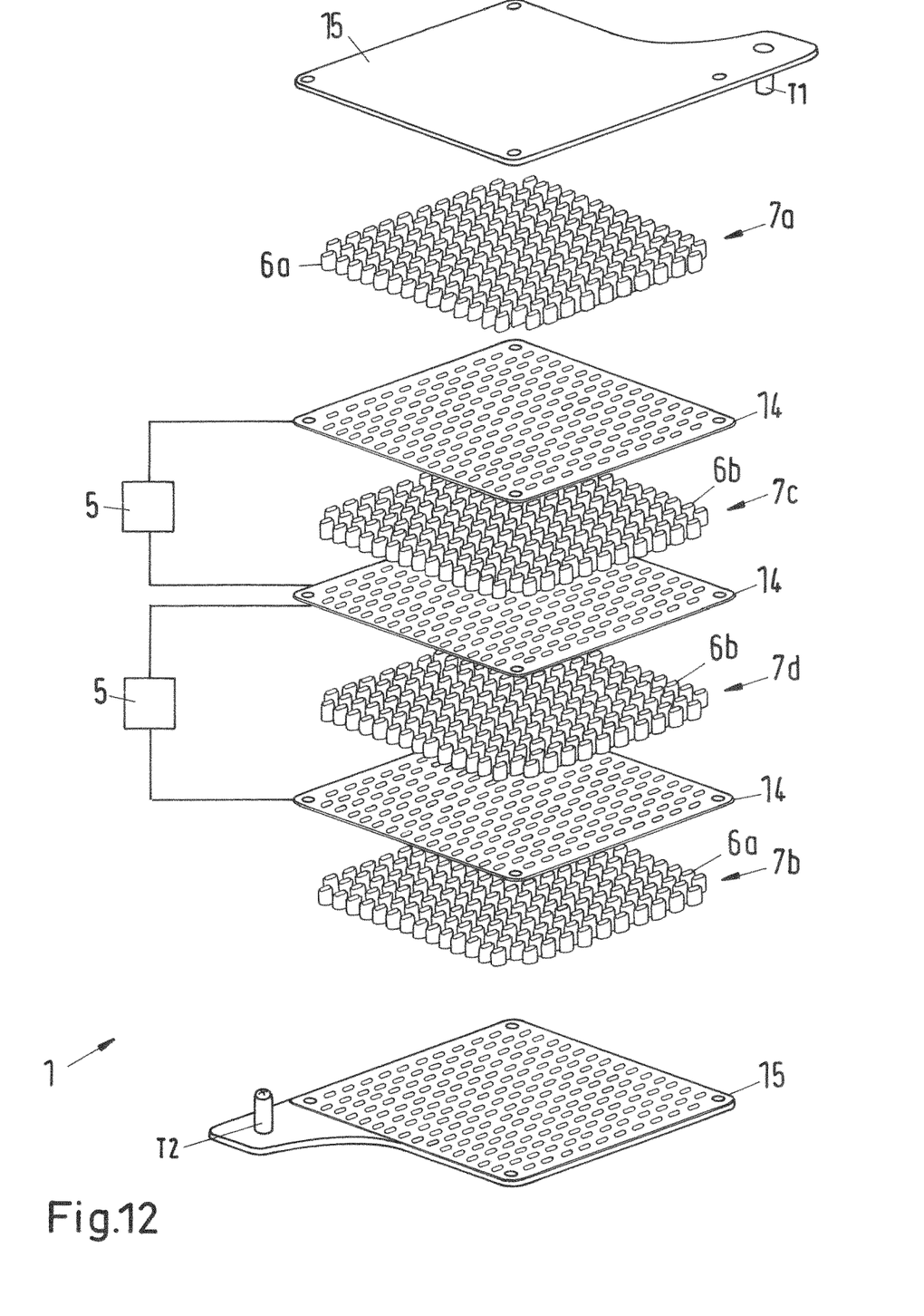

FIG. 12 shows a schematic perspective view on a voltage controllable capacitive device 1. The device 1 comprises multiple sub banks 7a, 7b, 7c, 7d of capacitors 6a, 6b(see e.g. FIG. 3). The capacitors of one sub bank 7a, 7b, 7c, 7d are electrically connected in parallel. In the shown embodiment, a first and a second sub bank 7a, 7b comprise only capacitors 6a with the further dielectric material 3, wherein a reference numeral is provided for only one capacitor 6a. The third and the fourth sub bank 7c, 7d comprise capacitors 6b with the first dielectric material, wherein a reference numeral is provided for only one capacitor 6b. Further, the device 1 comprises connecting plates 14, e.g. copper plates, by which the different sub banks 7a, 7b, 7c, 7d are electrically and mechanically connected. Terminal electrodes T1, T2 are provided by L-shaped electrode plates 15. The first sub bank 7a is electrically connected in series to the third sub bank 7c, which is again electrically connected in series to the fourth sub bank 7c, which is again connected in series to the second sub bank 7b.

Further shown are DC voltage providing means 5 which provide a DC voltage to the connecting plates 14 which enclose the third and the fourth sub bank 7c, 7d.

The invention claimed is:

1. A voltage-controllable capacitive device comprising a first dielectric material and at least one further dielectric material, wherein at least a permittivity of the first dielectric material is DC voltage-dependent, wherein a voltage dependence of the permittivity of the first dielectric material is different from a voltage dependence of a permittivity of the at least one further dielectric material, wherein the device further comprises at least one voltage providing element for providing a DC voltage to the first dielectric material, wherein the first dielectric material and the at least one further dielectric material are a ceramic material,
   wherein
   the first dielectric material is a class 2 ceramic capacitor material or a class 3 ceramic capacitor material, and wherein the at least one further dielectric material is a class 1 ceramic capacitor material.

2. The device according to claim 1, wherein the permittivity of the at least one further dielectric material is not DC voltage-dependent.

3. The device according to claim 1, wherein the first dielectric material is electrically arranged in between two further dielectric materials, wherein the voltage dependence of the permittivity of the first dielectric material is different from the voltage dependence of the permittivity of each of the further dielectric materials.

4. The device according to claim 1, further comprising a first capacitor with the first dielectric material and at least one further capacitor with the at least one further dielectric material, wherein the first and the at least one further capacitor are provided by separate components.

5. The device according to claim 1, wherein the device is provided by a monolithic compound.

6. The device according to claim 1, wherein a maximum output voltage of the voltage providing element is chosen as a function of a desired capacitance change.

7. A method for operating a voltage-controllable capacitive device of claim 1, the method comprising controlling the at least one voltage providing element such that a desired output voltage is provided to the first dielectric material, wherein the desired output voltage is determined as a function of a desired capacitance of the capacitive device.

8. A method for manufacturing a voltage-controllable capacitive device, the method comprising:
   providing a first dielectric material and at least one further dielectric material, wherein at least a permittivity of the first dielectric material is DC voltage-dependent, wherein a voltage dependence of the permittivity of the first dielectric material is different from a voltage dependence of a permittivity of the at least one further dielectric material, wherein the first dielectric material and the at least one further dielectric material is a ceramic material, wherein the first dielectric material is a class 2 ceramic capacitor material or a class 3 ceramic capacitor material, wherein the at least one further dielectric material is a class 1 ceramic capacitor material,
   providing at least one voltage providing element for providing a DC voltage to the first dielectric material, wherein the at least one voltage providing element is electrically connected to the first dielectric material, wherein the first and the at least one further dielectric material are arranged such that a desired capacitance is provided.

9. A device of a system for inductive power transfer, the device comprising at least one winding structure for generating or receiving an alternating electromagnetic field, wherein the device further comprises a voltage-controllable capacitive device according to claim 1.

* * * * *